MODULAR ELECTRICAL UNIT

Filed May 28, 1958 3 Sheets-Sheet 1

INVENTOR.
JACK S. KILBY
BY John W. Michael
ATTORNEY

MODULAR ELECTRICAL UNIT

Filed May 28, 1958 3 Sheets-Sheet 2

INVENTOR.
JACK S. KILBY
BY John W. Michael
ATTORNEY

Sept. 4, 1962 J. S. KILBY 3,052,822

MODULAR ELECTRICAL UNIT

Filed May 28, 1958 3 Sheets-Sheet 3

INVENTOR.
JACK S. KILBY

BY John W. Michael

ATTORNEY

3,052,822
MODULAR ELECTRICAL UNIT

Jack S. Kilby, Milwaukee, Wis., assignor to Globe-Union Inc., Milwaukee, Wis., a corporation of Delaware Filed May 28, 1958, Ser. No. 738,482
3 Claims. (Cl. 317—101)

This invention relates to improvements in modular electrical units and more particularly to modular units which include semiconductor devices such as transistors, diodes, thermistors, varistors, etc. and other circuit elements such as capacitors and resistors which are hermetically sealed in a closed container.

Previous methods for mounting the elements of a modular unit and hermetically sealing such unit have not been altogether satisfactory. One such method is disclosed in a copending application Serial No. 480,686, filed January 10, 1955, assigned to Globe-Union Inc., the assignee of this application, now Patent No. 2,945,163. In the arrangement disclosed, because of the means for sealing each transistor in an individual cavity, it is difficult to place the transistors very close together and requires more leads to establish connections between the sealed elements of the unit and the external circuitry.

It is the principal object of this invention, therefore, to provide a modular unit which is compact and inexpensive to manufacture and can be readily enclosed and hermetically sealed.

Another object is to provide such a unit which can be completely subassembled for testing and adjusting prior to hermetic sealing.

Another object is to provide such a unit in which, with slight variations in the type, arrangement and connection of the component elements, it is possible to provide a great variety of different circuit functions.

These objects are attained broadly by mounting the circuit elements of the unit on a ceramic plate and then inserting and hermetically sealing the subassembled unit in a suitable container.

More specifically, conductive paths are mounted and sealed in openings in the plate and electrically connected to semiconductor devices and other circuit elements such as resistors and capacitors mounted on the plate. Such conductive paths, semiconductor devices and other circuit elements are connected in circuit by conductive areas adhered to the faces of the plate and by suitable leads connected between the various elements of the unit. The subassembled unit can then be tested and adjusted prior to hermetic sealing. Hermetic sealing is accomplished by inserting the plate in the open end of a suitable container and then sealing the edge of the plate to the sides of the container with the semiconductor devices inside the container.

Other objects and advantages will be pointed out in, or be apparent from the specification and claims, as will obvious modifications of the embodiments shown in the drawings, in which:

Figures 2, 6, 7, 8:
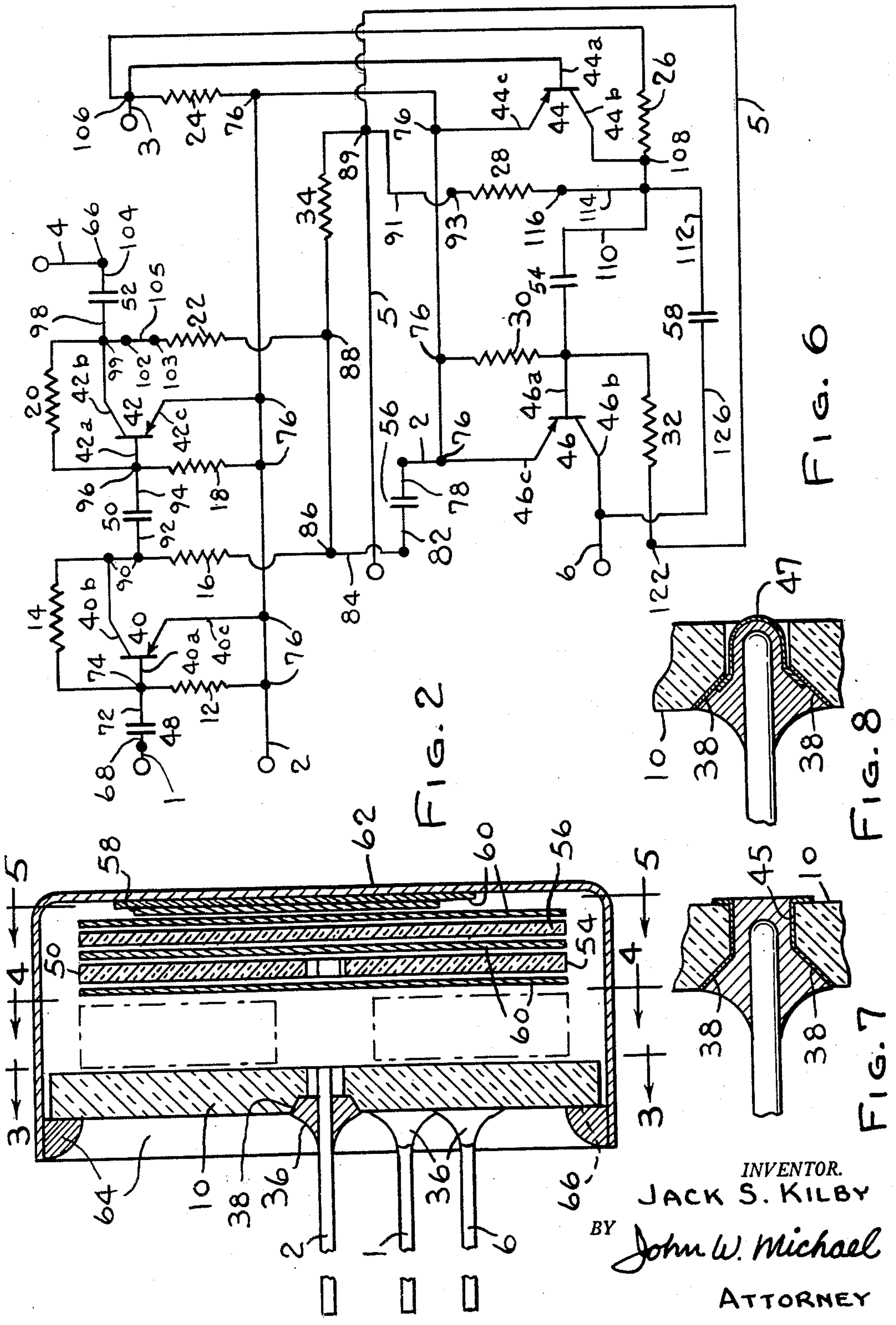
FIG. 2 is a sectional view taken along line 2—2 of FIG. 1 but with the capacitor leads omitted for purposes of clarity.
FIG. 6 is an electrical wiring diagram of the modular unit shown in FIGS. 1–5.
FIGS. 7 and 8 are fragmentary sectional views showing alternative arrangements for establishing conductive paths between the faces of the plate.

While this invention contemplates the use of various types of semiconductor devices connected in circuit with other circuit elements the specific embodiment shown and described herein includes a plurality of transistors, capacitors and resistors electrically connected as shown in FIG. 6 to provide a four-stage transistor amplifier unit.

Figures 1, 3:
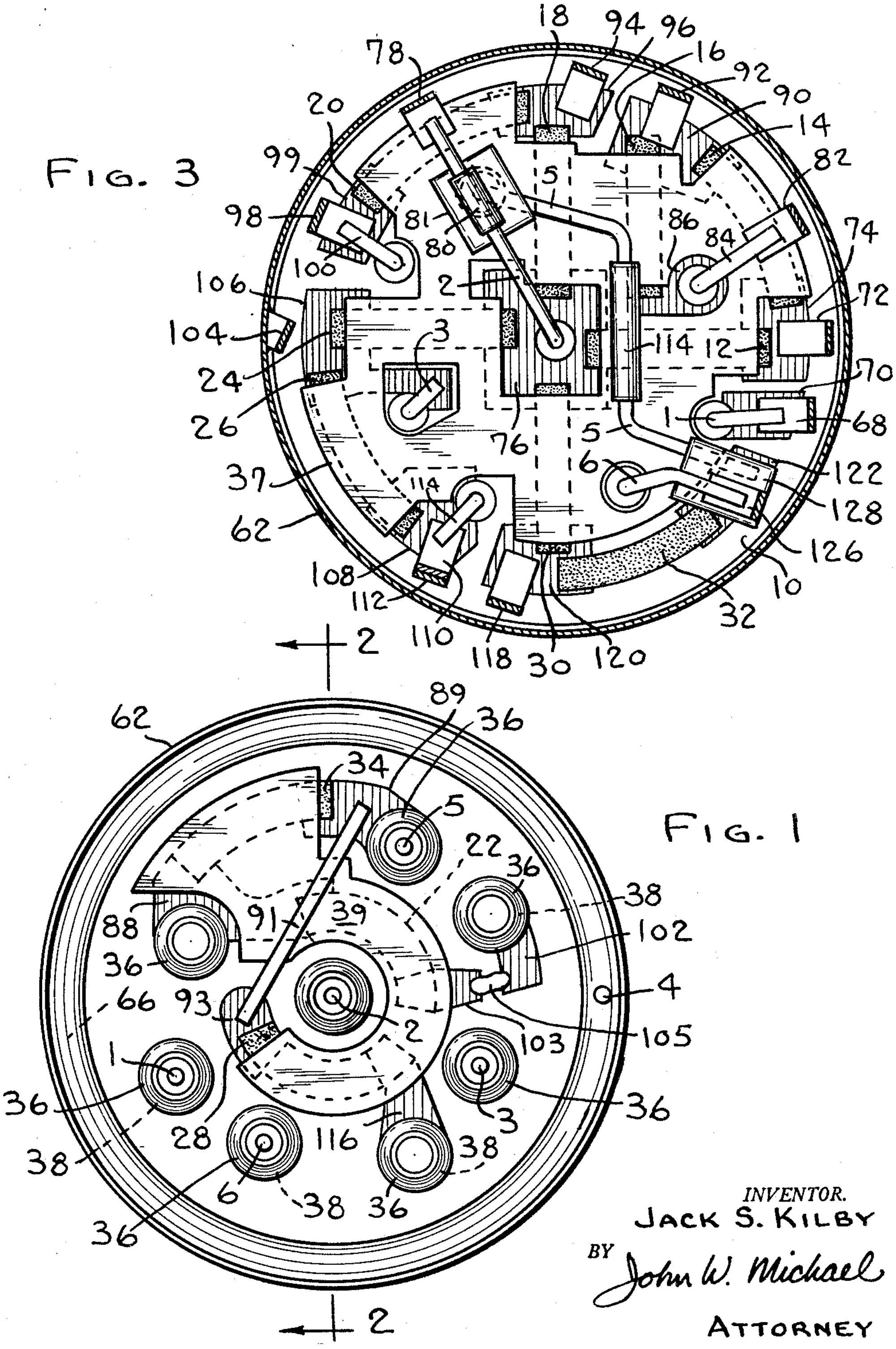
FIG. 1 is a plan view of a modular unit embodying the present invention.
FIG. 3 is a sectional view taken along line 3—3 of FIG. 2.

The unit includes a flat disc-shaped mounting plate 10 of ceramic material having a plurality of openings therein in which are mounted a plurality of wire leads 1, 2, 3, 5 and 6, which, along with lead 4, form the terminals for the unit. Resistors 12, 14, 16, 18, 20, 24, 26, 30 and 32 are adhered to the bottom face of plate 10 (FIG. 3) and resistors 22, 28 and 34 are adhered to the top face of the plate (FIG. 1). The resistors are electrically connected into the circuit by means of suitable conductive areas on either face of the plate, as described in detail hereinafter. The conductive areas may be applied by the stencil-screen process by which conductive material containing silver is applied to the ceramic plate and then fired to bond such material to the plate. The resistors may be applied to the plate in the form of paint containing carbon which is screened onto the faces of plate 10. Coatings 37 and 39 of insulative material are applied to the bottom and top faces of plate 10, respectively, after the resistors and conductive areas have been applied.

After the conductive areas, resistors and insulative coatings have been applied to plate 10, leads 1, 2, 3, 5 and 6 are inserted in the openings in the plate and soldered in place as at 36. Conductive areas 38 are provided around each opening to form a hermetic seal at such openings when the leads are soldered in place.

Figures 4, 5:
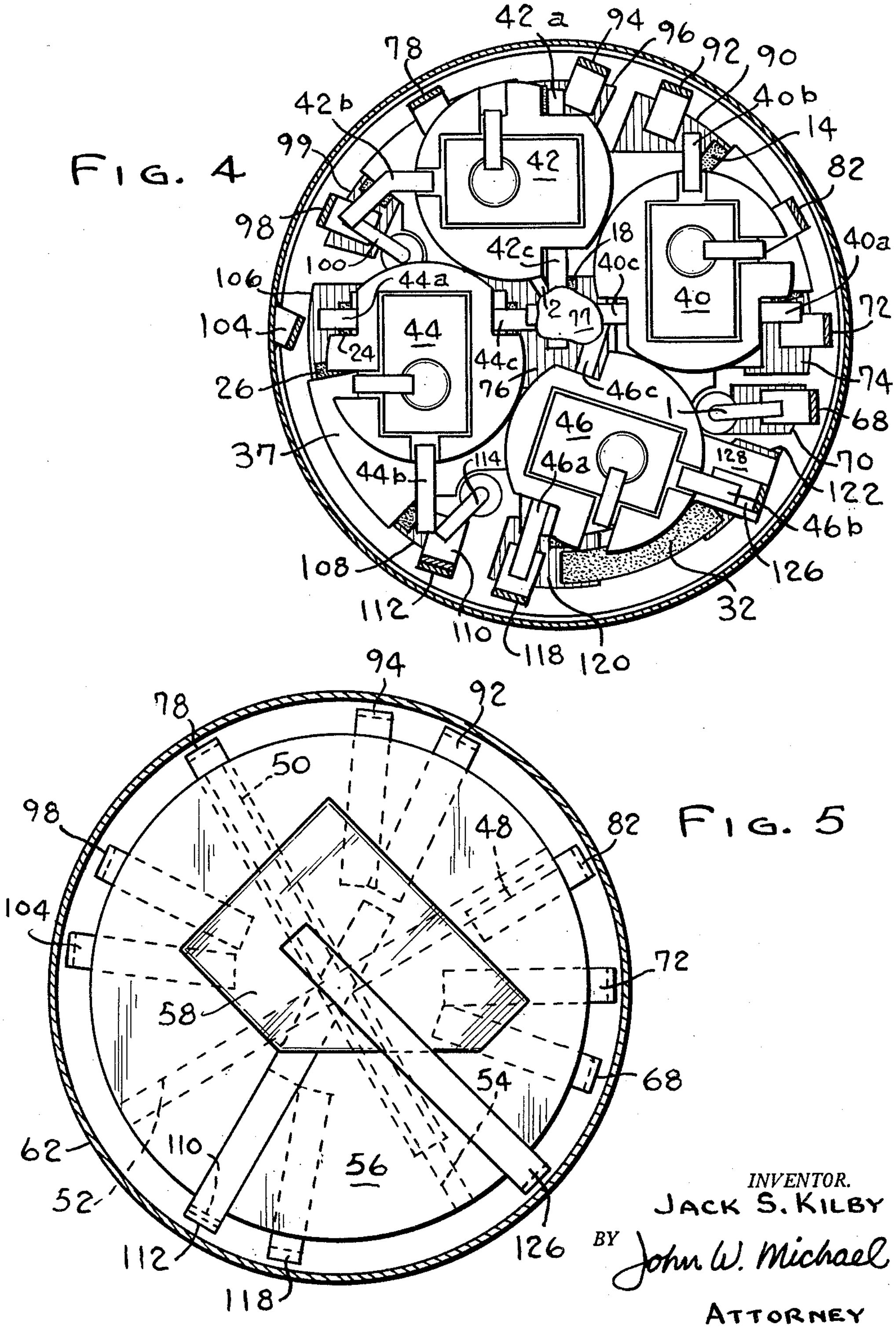
FIG. 4 is a sectional view taken along line 4—4 of FIG. 2.
FIG. 5 is a sectional view taken along line 5—5 of FIG. 2.

The ends of the leads extending through the openings are bent over and soldered to the conductive areas on the bottom of plate 10 as shown in FIG. 3 to establish conductive paths from the bottom to the face of the plate. Transistors 40, 42, 44 and 46 are then mounted on the underside of plate 10, as shown in FIG. 4. Each transistor has a set of three leads numbered 40*a*, 40*b*, 40*c*, and so on, which are soldered to the proper conductive areas as described in detail hereinafter.

FIGS. 7 and 8 show alternative arrangements for establishing conductive paths between the faces of plate 10. FIG. 7 shows a terminal lead soldered in an opening in the plate having a layer 45 of conductive material adhered to the walls of such opening to electrically connect the terminal with circuit elements mounted on the bottom face of the plate. Layer 45 may be conductive material containing silver applied by a brush or other suitable means or the layer may be in the form of an eyelet mounted in the opening and riveted over on the bottom face of the plate. Similarly, the desired conductive paths can be established by mounting a cup-shaped connector 47 of conductive material in the opening as shown in FIG. 8. It should be understood that the positions of layer 45 and connector 47 could be reversed from that shown in FIGS. 7 and 8 in which case conductive areas 38 would be applied around the openings on the bottom face of the plate. Furthermore, the terminal leads shown in FIGS. 7 and 8 could be eliminated and connection to external circuitry be established in any suitable manner wherein a conductor was placed in electrical contact with the solder in the openings.

To complete the circuit, six capacitors 48–58, inclusive, arranged in three layers, are mounted on the bottom of the plate overlying the transistors, as shown in FIGS. 2 and 5, and are connected into the circuit by suitable ribbon-leads, as described in detail hereinafter. Capacitors 48, 50, 52 and 54 (first layer) are quarter-disc capacitors, capacitor 56 (second layer) is a full-disc capacitor, and capacitor 58 (third layer) is a thin capacitor. The three layers of capacitors are separated by pieces of a suitable insulating tape 60.

The above described subassembly of plate, transistors, resistors and capacitors is tested and adjusted and then placed in a metal container 62. Container 62 is then soldered as at 64 to a ring 66 of conductive material adhered to the periphery of plate 10 to thereby hermetically seal the entire unit in the container. A terminal lead 4 is then connected to soldered area 64.

The electrical connections between the various circuit elements of the unit can best be described by tracing the circuit shown in FIG. 6 with reference to the physical location and mounting of the elements shown in FIGS. 1–5.

Terminal lead 1 is connected to one side of quarter-disc capacitor 48 by a ribbon-lead 68 anchored to the underside of plate 10 by a conductive area 70 (FIG. 3). A ribbon-lead 72 from the other side of capacitor 48 connects to the ends of resistors 12 and 14 and to transistor lead 40*a* by means of a conductive area 74 (FIGS. 3 and 4).

Terminal lead 2 (at the center opening) connects to resistors 12, 18, 24 and 30 (FIG. 3) and to transistor leads 40*c*, 42*c*, 44*c* and 46*c* (FIG. 4) by means of a conductive area 76. A drop of solder 77 (FIG. 4) is applied over these transistor leads to insure a good connection between the leads and area 76. The end of lead 2 is bent over and soldered to a ribbon-lead 78 (FIG. 3) which connects to one side of full-disc capacitor 56. The aforementioned insulative coating 37 applied to the bottom of the plate 10 insulates lead 2 from resistor 20 and a piece of adhesive tape 80 on lead 2 and a flat piece of tape 81 insulates such lead from lead 5 as shown in FIG. 3. A ribbon-lead 82 from the other side of capacitor 56 is soldered to an internal wire lead 84 which, in turn, is soldered in an opening in the ceramic plate (FIG. 3). Lead 84 connects to resistor 16 by means of a conductive area 86 on the bottom of plate 10 surrounding the opening in which such lead is mounted (FIG. 3) and connects to one end of resistors 22 and 34 on the top side of the plate by means of a conductive area 88 (FIG. 1).

The other end of resistor 34 is connected to terminal lead 5 by means of a conductive area 89 on the top of the plate at the opening in which lead 5 is soldered (FIG. 1). Conductive area 89 is connected to one end of resistor 28 adhered to the top face of the plate by a wire lead 91 soldered at one end to area 89 and soldered at the other end to a conductive area 93 in contact with resistor 28, as shown in FIG. 1. Wire lead 91 is insulated from the conductive areas and resistors on the top face of the plate by the aforementioned protective coating 39.

Resistor 14, connected at one end to conductive area 74, is connected at its other end to transistor lead 40*b* and resistor 16 by means of a conductive area 90. Conductive area 90 connects with one side of quarter-disc capacitor 50 by a ribbon-lead 92 soldered to such conductive area. A ribbon-lead 94 connected to the other side of capacitor 50 connects to one end of resistors 18 and 20 and transistor lead 42*a* by means of a conductive area 96. The other end of resistor 20 is connected to transistor lead 42*b* by a conductive area 99 and to one side of quarter-capacitor 52 by means of a ribbon-lead 98 soldered to conductive area 99 (FIG. 3). Conductive area 99 is connected to the other end of resistor 22 by an internal wire lead 100 and conductive areas 102 and 103 on the top face of plate 10. Wire lead 100 is soldered in an opening in plate 10 and connects to conductive area 102 by virtue of the conductive area 38 around the opening on the top face of the plate and the gap between conductive areas 102 and 103 is closed by solder 105 after the unit has been assembled and adjusted. A ribbon-lead 104 connected to the other side of quarter-disc capacitor 52 is bent around the edge of plate 10 for connection to conductive ring 66 on the top face of the plate and terminal lead wire 4 connected to soldered area 64.

Resistor 24, connected at one end to conductive area 76 is connected at its other end to terminal wire 3, transistor lead 44*a* and one end of resistor 26 by means of conductive area 106 (FIGS. 3 and 4). Lead 3, soldered in an opening in the plate has its end bent over and soldered to conductive area 106 as shown in FIG. 3. The other end of resistor 26 is connected to transistor lead 44*b* by means of a conductive area 108 (FIG. 4). Conductive area 108 connects to one side of quarter-disc capacitor 54 and thin capacitor 58 by means of ribbon-leads 110 and 112, respectively, soldered (one on top of the other) to area 108. Conductive area 108 is also connected to the other end of resistor 28 by means of an internal wire lead 114 and a conductive area 116 on the top face of plate 10 (FIGS. 1 and 3). Wire lead 114 is soldered at one end to ribbon-lead 110 and has its other end soldered in an opening in the plate for connection to area 116 by virtue of a conductive area 38 around the opening on the top side of the plate (FIGS. 1 and 3).

A ribbon-lead 118, connected to the other side of quarter-disc capacitor 54, connects to one end of resistors 30 and 32 and to transistor lead 46*a* by means of a conductive area 120. The other end of resistor 32 is connected to the end of terminal lead wire 5 by means of a conductive area 122. The portion of lead wire 5 which overlies the bottom face of the plate is insulated from the other parts of the circuit by means of a piece of adhesive tape 124 on such portion (FIG. 3).

A ribbon-lead 126, connected to the other side of thin capacitor 58, is soldered to the end of terminal lead wire 6 (FIG. 3) and to transistor lead 46*b* (FIG. 4). Lead 126 is insulated from resistor 32 and the end of lead 5 by a piece of adhesive tape 128.

The elements of the unit mounted and connected as described above provide a four-stage transistor amplifier suitable for many applications such as hearing aids. It will be apparent to those skilled in the art that various other circuits can be made by simply varying the type, arrangement and connection of the component elements mounted on the ceramic plate. Therefore, although only a few embodiments of the present invention have been illustrated and described, various changes and modifications may be made therein without departing from the spirit of the invention or from the scope of the appended claims.

I claim:

1. A modular electrical unit comprising, an insulating plate having a plurality of openings therein, a semiconductor device mounted on one face of said plate, other circuit elements mounted on said one face of said plate, conductive paths mounted in said openings extending between the faces of said plate, means for hermetically sealing said conductive paths in said openings, means including conductive areas adhered to said plate for electrically connecting said conductive paths, semiconductor device and other circuit elements to produce a useful electrical circuit, a container in which said plate with said semiconductor device and other circuit elements mounted thereon is inserted, and means for sealing said plate to said container to hermetically seal said semiconductor device and other circuit elements in said container, said means for sealing said container to said plate including a metallized area adhered to the other face of said plate around the periphery thereof, said container being of metal material and soldered to said metallized area on said other face of said plate.

2. A modular electrical unit according to claim 1 in which said means for hemetrically sealing said conductive paths in said openings includes metallized areas adhered to a face of said plate surrounding said openings, said conductive paths soldered to said metallized areas surrounding said openings to hermetically seal said conductive paths in said openings.

3. A modular electrical unit comprising, a ceramic plate having a plurality of openings therein, conductive paths mounted in said openings extending between the faces of said plate, means for hermetically sealing said conductive paths in said openings, a plurality of resistors applied to at least one face of said plate, a plurality of transistors mounted on one face of said plate in side-by-side relationship, a plurality of capacitors mounted in stacked relationship one on top of the other on said one face of said plate overlying said transistors, means including conductive areas adhered to the faces of said plate for connecting said conductive paths, transistors, resistors and capacitors together to produce a useful electrical circuit, a container in which said plate with said resistors, transistors and capacitors mounted thereon is inserted, and means for sealing said container to said plate to hermetically seal said transistors and capacitors mounted on said one face of said plate in said container.

References Cited in the file of this patent

UNITED STATES PATENTS

| | | |
|---|---|---|
| 2,486,110 | Bugel | Oct. 25, 1949 |
| 2,493,199 | Khouri | Jan. 3, 1950 |
| 2,502,291 | Taylor | Mar. 28, 1950 |
| 2,537,961 | Bonner | Jan. 16, 1951 |
| 2,542,651 | Franklin | Feb. 20, 1951 |
| 2,733,320 | Herterick | Jan. 31, 1956 |
| 2,752,537 | Wolfe | June 26, 1956 |
| 2,853,656 | Dowds | Sept. 23, 1958 |
| 2,889,532 | Slack | June 2, 1959 |
| 2,907,925 | Parsons | Oct. 6, 1959 |

FOREIGN PATENTS

| | | |
|---|---|---|
| 129,601 | Australia | Oct. 25, 1948 |